106. COMPOSITIONS, COATING OR PLASTIC.

98

(No Model.)

A. S. SAMPSON & D. G. PECK.
ARTIFICIAL FLAG STONE.

No. 315,557. Patented Apr. 14, 1885.

A flag-stone of rectangular shape formed in mold and allowed to harden before being laid in place, and composed of sand or like material, cement, and water containing the solution hereinbefore set forth, substantially as and for the purpose set forth.

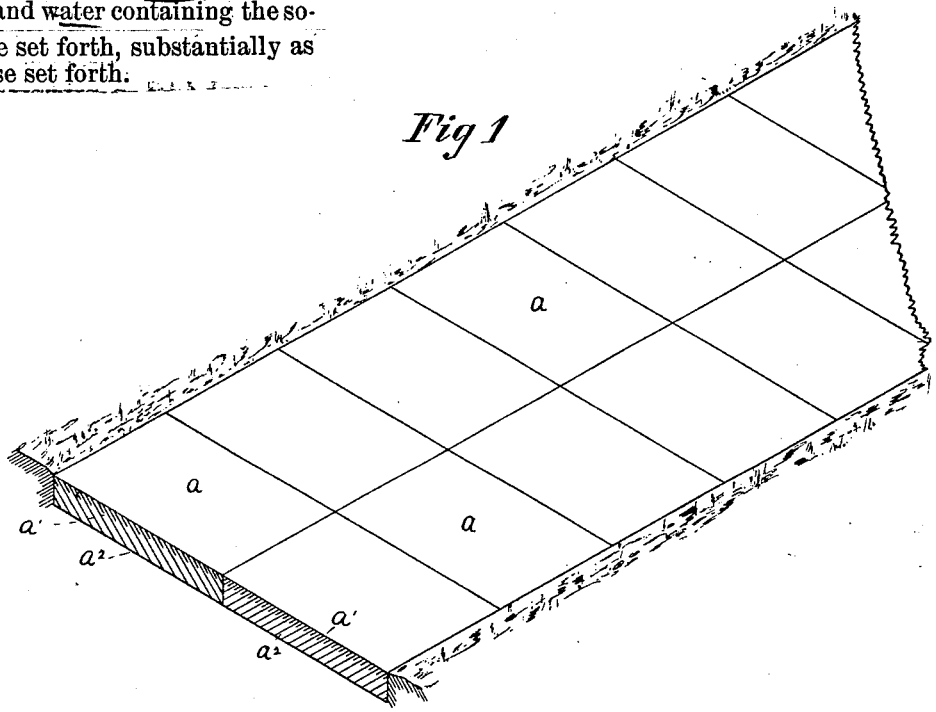

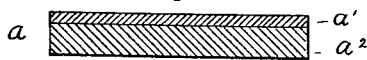

Witnesses:
J. Frank Collom
Orlando H. Peck

Inventors:
Augustus S. Sampson
& Daniel G. Peck
By P. H. Gunckel
Attorney
UNITED STATES PATENT OFFICE.

AUGUSTUS S. SAMPSON AND DANIEL G. PECK, OF MINNEAPOLIS, MINN.

ARTIFICIAL FLAG-STONE.

SPECIFICATION forming part of Letters Patent No. 315,557, dated April 14, 1885.

Application filed August 21, 1884. (No model.)

*To all whom it may concern:*

Be it known that we, AUGUSTUS S. SAMPSON and DANIEL G. PECK, citizens of the United States, residing at Minneapolis, in the county of Hennepin and State of Minnesota, have invented a new and useful Improvement in Artificial Flag-Stones; and we do hereby declare that the following is a full, clear, and exact description of the same.

Our invention relates to the production of artificial stones for pavements, and has for its object the providing of flag-stones of rectangular shape, of convenient sizes, and of cheap and durable materials, as a substitute for the more costly natural stone.

Our invention consists of rectangular flag-stones, composed of sand or like substance, cement, and water containing the solution hereinafter set forth.

Heretofore artificial-stone pavements have been made of blocks of rectangular or hexagonal shape of small size, or, if in larger sections, the sections have been formed in place while the material was in a plastic condition. But we are not aware that artificial flag-stones of rectangular form and of considerable length and width have been used.

In the drawings, Figure 1 is a perspective of a portion of a walk laid with the improved artificial flag-stones. Fig. 2 is a cross-section of one of the stones; and Fig. 3 is a longitudinal section of same.

*a a* are the flag-stones, which should be about two feet wide by two feet or more long.

*a'* is the dressing or facing, containing, preferably, half-and-half of sand and cement, and *a²* is the base or backing containing, preferably, two parts sand to one part cement.

In the construction of the stones we prefer clean sharp sand and Portland cement. The backing may constitute about three-fourths of the thickness of the stone, and the facing should be about a half-inch or more thick.

In mixing both the backing and facing we prefer to use water containing the following solution, to wit: to five gallons of water add tartaric acid, one ounce; soda arsenias, two ounces, or, instead, borax, two pounds; soda caustica, eight ounces, or, instead, pulverized alum, three pounds; oxide of lead, two pounds; tartrate of soda, two ounces; subcarbonate of iron, two pounds; common salt, one pound. The subcarbonate of iron and the salt are first put into the water, which is then boiled ten to fifteen minutes. The oxide of lead is next added, and afterwards the remainder of the ingredients, and the whole kept boiling fifteen minutes longer, and is kept well stirred. Of this solution we add about one half-gallon to each hundred gallons of water to be used in mixing the sand and cement. Any well-known coloring-matter may be added, if desired, in the usual manner.

To form the flag-stones, we use a mold of about six inches depth, two feet width, and four feet length, provided with a slide adjustable longitudinally in the mold. Thus, by placing the slide in the middle the mold will form two flag-stones two feet square at a time, and if stones of greater length are wanted the slide can be adjusted to form any length between two and four feet, when but one stone will be formed at a time.

We first place in the mold a board for a bottom of a size corresponding with that of the stones to be made. This bottom is movable vertically within the mold by means of a lever at the bottom of the mold-table, operating vertically-sliding bars within the mold, in the manner well understood in the art to which it relates, and any well-known means may be used for locking the lever so as to hold the bottom to the proper place within the mold. We then spread a thin coating of the facing material around the sides of the mold to give a finish to the edges of the stone. Then the material for the backing is poured into the mold to the depth of about an inch and a half for a two-inch stone, or in the same proportion for stones of greater thickness. Upon this is then poured the facing material, and the whole well tamped and struck off in the usual manner, and the plastic stone with the movable bottom is lifted out of the mold by means of the lever and set aside on drying-frames for the stone to harden. When hardened, they are ready for use in the place of flag-stones of natural stone.

Having fully described our invention, what we claim, and desire to secure by Letters Patent, is—

A flag-stone of rectangular shape formed in a mold and allowed to harden before being laid in place, and composed of sand or like material, cement, and water containing the solution hereinbefore set forth, substantially as and for the purpose set forth.

AUGUSTUS S. SAMPSON.
DANIEL G. PECK.

Witnesses:
P. H. GUNCKEL,
WM. BLACKBURN.